United States Patent
Xiong et al.

(10) Patent No.: US 11,629,974 B2
(45) Date of Patent: Apr. 18, 2023

(54) METHOD AND APPARATUS FOR GENERATING INFORMATION

(71) Applicant: Baidu Online Network Technology (Beijing) Co., Ltd., Beijing (CN)

(72) Inventors: Wei Xiong, Beijing (CN); Xuning Cai, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 405 days.

(21) Appl. No.: 16/670,275

(22) Filed: Oct. 31, 2019

(65) Prior Publication Data
US 2020/0152064 A1    May 14, 2020

(30) Foreign Application Priority Data
Nov. 9, 2018    (CN) .......................... 201811333323.7

(51) Int. Cl.
| | | |
|---|---|---|
| *G01C 21/00* | (2006.01) | |
| *G08G 1/01* | (2006.01) | |
| *G08G 1/048* | (2006.01) | |
| *G08G 1/16* | (2006.01) | |
| *G06V 20/56* | (2022.01) | |

(Continued)

(52) U.S. Cl.
CPC ......... *G01C 21/3822* (2020.08); *G06F 18/25* (2023.01); *G06V 10/75* (2022.01); *G06V 20/582* (2022.01); *G06V 20/588* (2022.01); *G08G 1/0112* (2013.01); *G08G 1/048* (2013.01); *G08G 1/165* (2013.01)

(58) Field of Classification Search
CPC ............... G06V 20/588; G05D 1/0212; G05D 2201/0213
See application file for complete search history.

(56) References Cited

U.S. PATENT DOCUMENTS

| | | | | |
|---|---|---|---|---|
| 6,047,234 A | * | 4/2000 | Cherveny | G01C 21/32 |
| | | | | 701/451 |
| 10,671,075 B1 | * | 6/2020 | Kobilarov | G06V 20/56 |

(Continued)

FOREIGN PATENT DOCUMENTS

| | | |
|---|---|---|
| CN | 101650190 B | 2/2016 |
| CN | 105741595 A | 7/2016 |

(Continued)

OTHER PUBLICATIONS

Chinese Patent Application No. 201811333323 First Office Action dated Sep. 30, 2019, 8 pages.

(Continued)

*Primary Examiner* — Jeff A Burke
*Assistant Examiner* — Christopher A Buksa
(74) *Attorney, Agent, or Firm* — Cozen O'Connor

(57) ABSTRACT

Embodiments of the present disclosure relate to a method and apparatus for generating information. The method can include: acquiring first driving environment data of a target road segment; comparing the first driving environment data with pre-stored second driving environment data of the target road segment, and determining a difference between the first driving environment data and the second driving environment data; and generating, in response to determining the difference satisfying a preset condition, road abnormality information.

16 Claims, 4 Drawing Sheets

(51) Int. Cl.
G06F 18/25 (2023.01)
G06V 10/75 (2022.01)
G06V 20/58 (2022.01)

(56) References Cited

U.S. PATENT DOCUMENTS

| | | | |
|---|---|---|---|
| 10,909,725 B2* | 2/2021 | Mammou | ................ H03M 7/30 |
| 2003/0125871 A1 | 7/2003 | Cherveny et al. | |
| 2017/0167881 A1* | 6/2017 | Rander | ................ G05D 1/0274 |

FOREIGN PATENT DOCUMENTS

| | | |
|---|---|---|
| CN | 105973245 A | 9/2016 |
| CN | 106767855 A | 5/2017 |
| CN | 106996793 A | 8/2017 |

OTHER PUBLICATIONS

English Translation of Chinese Patent Application No. 201811333323 First Office Action dated Sep. 30, 2019, 6 pages.

* cited by examiner

METHOD AND APPARATUS FOR GENERATING INFORMATION

CROSS-REFERENCE TO RELATED APPLICATIONS

This application claims priority to Chinese Application No. 201811333323.7, filed on Nov. 9, 2018 and entitled "Method and Apparatus for Generating Information," the entire disclosure of which is hereby incorporated by reference.

TECHNICAL FIELD

Embodiments of the present disclosure relate to the field of computer technology, and specifically to a method and apparatus for generating information.

BACKGROUND

The positioning function of an autonomous driving vehicle relies on an electronic map. When a driving environment changes, the electronic map may be inconsistent with the actual situation of a road, resulting in inaccurate positioning. If the autonomous driving vehicle drives on such a road in accordance with the original electronic map, a vehicle accident may happen.

SUMMARY

Embodiments of the present disclosure propose a method and apparatus for generating information.

In a first aspect, some embodiments of the present disclosure provide a method for generating information. The method includes: acquiring first driving environment data of a target road segment; comparing the first driving environment data with pre-stored second driving environment data of the target road segment, and determining a difference between the first driving environment data and the second driving environment data; and generating, in response to determining the difference satisfying a preset condition, road abnormality information.

In some embodiments, the generating, in response to determining the difference satisfying a preset condition, road abnormality information includes: recognizing a type of an object corresponding to the difference; and generating, in response to determining the type of the object matching at least one type in a preset type set, the road abnormality information.

In some embodiments, the generating, in response to determining the difference satisfying a preset condition, road abnormality information includes: determining, in response to determining the type of the object matching the at least one type in the preset type set, a difference distance corresponding to the difference; and generating, in response to determining the difference distance being greater than or equal to a preset threshold, the road abnormality information.

In some embodiments, the determining a difference between the first driving environment data and the second driving environment data includes: converting, in response to determining the first driving environment data including image data and the second driving environment data including point cloud data or in response to determining the second driving environment data including image data and the first driving environment data including point cloud data, the point cloud data to obtain image data corresponding to the point cloud data; and comparing the image data obtained through the conversion with the image data included in the first driving environment data or included in the second driving environment data, to determine a difference between the image data obtained through the conversion and the image data included in the first driving environment data or included in the second driving environment data.

In some embodiments, the method further includes: acquiring a vehicle identifier corresponding to a driving route including the target road segment; and sending the road abnormality information to a vehicle indicated by the vehicle identifier.

In some embodiments, the method further includes: updating, in response to determining the difference satisfying the preset condition, the second driving environment data according to the first driving environment data.

In some embodiments, the method further includes: generating, in response to a completion of the updating of the second driving environment data, an electronic map according to the updated second driving environment data; and outputting the electronic map.

In a second aspect, some embodiments of the present disclosure provide an apparatus for generating information. The apparatus includes: a data acquiring unit, configured to acquire first driving environment data of a target road segment; a difference determining unit, configured to compare the first driving environment data with pre-stored second driving environment data of the target road segment, and determine a difference between the first driving environment data and the second driving environment data; and an information generating unit, configured to generate, in response to determining the difference satisfying a preset condition, road abnormality information.

In some embodiments, the information generating unit includes: a type recognizing module, configured to recognize a type of an object corresponding to the difference; and an information generating module, configured to generate, in response to determining the type of the object matching at least one type in a preset type set, the road abnormality information.

In some embodiments, the information generating module is further configured to: determine, in response to determining the type of the object matching the at least one type in the preset type set, a difference distance corresponding to the difference; and generate, in response to determining the difference distance being greater than or equal to a preset threshold, the road abnormality information.

In some embodiments, the difference determining unit is further configured to: convert, in response to determining the first driving environment data including image data and the second driving environment data including point cloud data or in response to determining the second driving environment data including image data and the first driving environment data including point cloud data, the point cloud data to obtain image data corresponding to the point cloud data; and compare the image data obtained through the conversion with the image data included in the first driving environment data or included in the second driving environment data, to determine a difference between the image data obtained through the conversion and the image data included in the first driving environment data or included in the second driving environment data.

In some embodiments, the apparatus further includes: an identifier acquiring unit, configured to acquire a vehicle identifier corresponding to a driving route including the target road segment; and an information sending unit, configured to send the road abnormality information to a vehicle indicated by the vehicle identifier.

In some embodiments, the apparatus further includes: a data updating unit, configured to update, in response to determining the difference satisfying the preset condition, the second driving environment data according to the first driving environment data.

In some embodiments, the apparatus further includes: a map generating unit, configured to generate, in response to a completion of the updating of the second driving environment data, an electronic map according to the updated second driving environment data; and a map outputting unit, configured to output the electronic map.

In a third aspect, some embodiments of the present disclosure provide a server. The server includes: one or more processors; and a storage device, configured to store one or more programs. The one or more programs, when executed by the one or more processors, cause the one or more processors to implement the method described in any embodiment in the first aspect.

In a fourth aspect, some embodiments of the present disclosure provide a computer readable medium storing a computer program. The program, when executed by a processor, implements the method described in any embodiment in the first aspect.

According to the method and apparatus for generating information provided by some embodiments of the present disclosure, the first driving environment data of the target road segment may first be acquired. Then, the first driving environment data may be compared with the pre-stored second driving environment data of the target road segment, to determine the difference between the first driving environment data and the second driving environment data. Finally, when it is determined that the difference satisfies the preset condition, the road abnormality information is generated. Thus, an abnormal situation of the target road segment can be found in time, and the road abnormality information can be generated, so that traffic accidents can be reduced.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail by combining the accompanying drawings and some embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
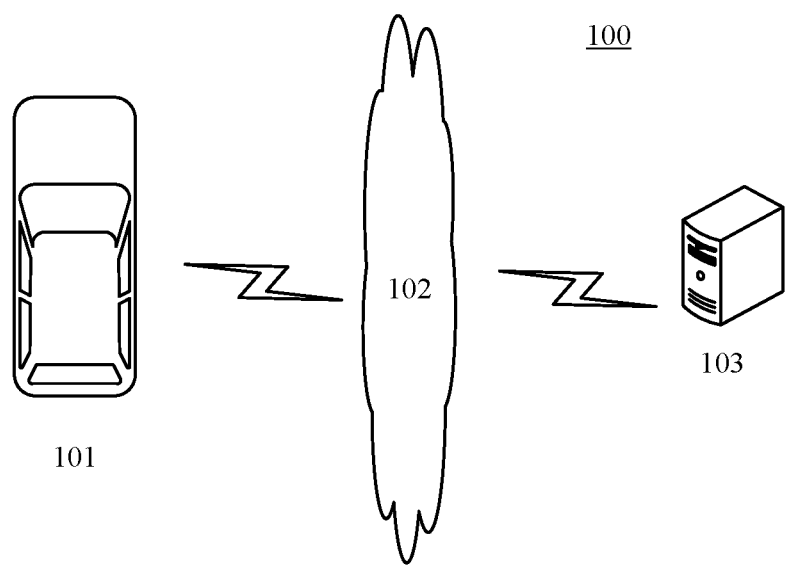
FIG. 1 is a diagram of an example system architecture in which an embodiment of the present disclosure may be implemented.

FIG. 1 shows an example system architecture 100 in which a method for generating information or an apparatus for generating information according to an embodiment of the present disclosure may be implemented.

As shown in FIG. 1, the system architecture 100 may include a vehicle 101, a network 102, and a server 103. The network 102 serves as a medium providing a communication link between the vehicle 101 and the server 103. The network 102 may include various types of connections, for example, wired or wireless communication links, or optical fiber cables.

The vehicle 101 may interact with the server 103 via the network 102, to receive or send messages. Various electronic apparatuses (e.g., an image collection apparatus, a sensor, and a vehicle controller) may be installed on the vehicle 101. The sensor may be used to collect environmental data and driving data of the interior and exterior of the vehicle 101.

The vehicle 101 may be various kinds of vehicles, including, but not limited to, a large passenger bus, a tractor, a city bus, a medium passenger bus, a large truck, a compact car, a compact automatic-gear car, an autonomous driving vehicle or other smart vehicles.

The server 103 may be a server providing various kinds of services, for example, a backend server analyzing driving environment data collected by the vehicle 101. The backend server may process the received driving environment data or the like, and feed back the processing result (e.g., road abnormality information) to the vehicle 101.

It should be noted that the server 103 may be hardware or software. When being the hardware, the server 103 may be implemented as a distributed server cluster composed of a plurality of servers, or as a single server. When being the software, the server 103 may be implemented as a plurality of pieces of software or a plurality of software modules (e.g., software or software modules for providing a distributed service), or as a single piece of software or a single software module, which will not be specifically defined here.

It should be noted that the method for generating information provided by some embodiments of the present disclosure is generally performed by the server 103. Correspondingly, the apparatus for generating information is generally provided in the server 103.

It should be appreciated that the numbers of the vehicles, the networks, and the servers in FIG. 1 are merely illustrative. Any number of vehicles, networks, and servers may be provided based on actual requirements.

Figure 2:
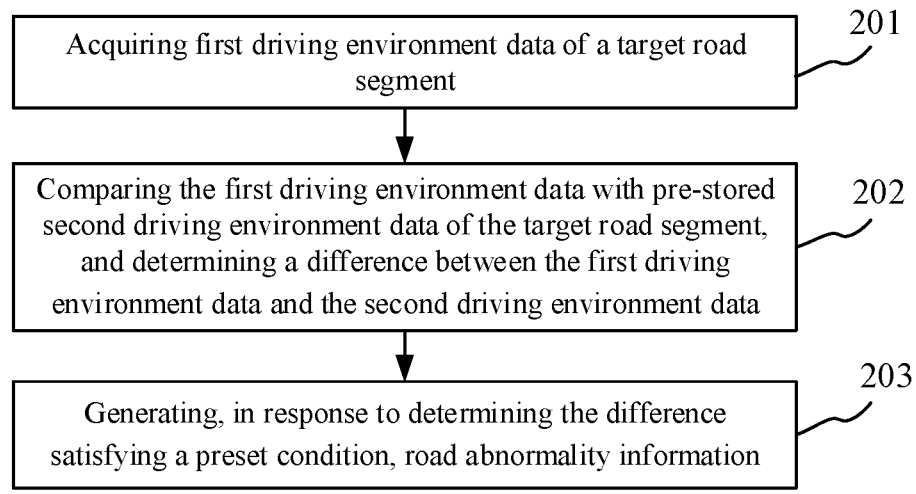
FIG. 2 is a flowchart of a method for generating information according to an embodiment of the present disclosure.

Further referring to FIG. 2, FIG. 2 illustrates a flow 200 of a method for generating information according to an embodiment of the present disclosure. The method for generating information in this embodiment includes the following steps.

Step 201, acquiring first driving environment data of a target road segment.

In this embodiment, an executing body (e.g., the server 103 shown in FIG. 1) of the method for generating information may acquire, from a collection apparatus installed on a vehicle, the first driving environment data of the target road segment by means of a wireless connection. The vehicle may be various vehicles driving on the target road segment, for example, a bus, a car or an autonomous driving vehicle. Various apparatuses (e.g., a camera and a radar detecting apparatus) for collecting a driving environment may be installed on the above vehicle. The first driving environment data may be information (e.g., a temperature, a humidity and a wind speed) of an environment where the vehicle is located, information of the road (e.g., crossing information, a road width, the position of a median strip in the road) on which the vehicle is located, obstacles around the vehicle, or the like. The first driving environment data may be image data or point cloud data.

It should be noted that the wireless connection may include, but not limited to, a 3G/4G connection, a WiFi connection, a Bluetooth connection, a WiMAX connection, a Zigbee connection, an UWB (ultra wideband) connection, or other wireless connections now known or developed in the future.

Step 202, comparing the first driving environment data with pre-stored second driving environment data of the target road segment, and determining a difference between the first driving environment data and the second driving environment data.

After acquiring the first driving environment data of the target road segment, the executing body may compare the first driving environment data with the pre-stored second driving environment data of the target road segment, to determine the difference between the first driving environment data and the second driving environment data. The second driving environment data may be locally pre-stored in the executing body, or may be pre-stored in other storage devices in communication connection with the executing body. The second driving environment data may be image data or point cloud data. It may be understood that the collection time of the second driving environment data is earlier than the collection time of the first driving environment data.

In some alternative implementations of this embodiment, when the data format of the first driving environment data and the data format of the second driving environment data are different, the executing body may first convert the data format of the first driving environment data or of the second driving environment data, so that the converted data format is the same as the other data format. Then, the first driving environment data and the second driving environment data are compared, and thus, the difference between the first driving environment data and the second driving environment data may be directly obtained. The executing body may implement step 202 through the following steps not shown in FIG. 2: in response to determining the first driving environment data including image data and the second driving environment data including point cloud data, or in response to determining the second driving environment data including image data and the first driving environment data including point cloud data, converting the point cloud data to obtain image data corresponding to the point cloud data; and comparing the image data obtained through the conversion with the image data included in the first driving environment data or included in the second driving environment data, to determine a difference between the image data obtained through the conversion and the image data included in the first driving environment data or included in the second driving environment data.

When the first driving environment data includes the image data and the second driving environment data includes the point cloud data, or when the first driving environment data includes the point cloud data and the second driving environment data includes the image data, the executing body may first convert the point cloud data, to obtain the image data corresponding to the point cloud data. Then, the image data obtained through the conversion is compared with the image data included in the first driving environment data or the image data included in the second driving environment data, to determine the difference between the image data. It may be understood that the above difference is the difference between the first driving environment data and the second driving environment data.

Step 203, generating, in response to determining the difference satisfying a preset condition, road abnormality information.

After determining the difference between the first driving environment data and the second driving environment data, the executing body may determine whether the difference satisfies the preset condition. If the difference satisfies the preset condition, the road abnormality information is generated. The preset condition may be a condition for restricting a type of an object corresponding to the difference, or may be a condition for restricting a difference distance of the object corresponding to the difference. For example, if the difference refers to a change of a lane line, the object corresponding to the difference is the lane line. The above preset condition may refer to that the type of the object is the lane line. Alternatively, the difference is a change of the position of a traffic light. The preset condition may refer to that the changed distance is greater than 3 meters. The road abnormality information is used to remind the vehicle or a technician that the second driving environment data does not conform to the current driving environment, and the second driving environment data needs to be updated. The executing body may send the generated road abnormality information to an autonomous driving vehicle, and the autonomous driving vehicle may stop driving after receiving the road abnormality information, to avoid a traffic accident.

In some alternative implementations of this embodiment, step 203 may be specifically implemented through the following steps not shown in FIG. 2: recognizing the type of the object corresponding to the difference; and generating, in response to determining the type of the object matching at least one type in a preset type set, the road abnormality information.

In this implementation, the executing body may first recognize the type of the object corresponding to the difference. Then, the type of the obtained object is matched with each type in the preset type set. When the type of the object matches the at least one type in the type set, the road abnormality information is generated. The type of the object in the type set should be the type of an object on the road that does not move frequently and affects the vehicle, for example, the lane line, a traffic sign, a median strip, or a building. As an example, if the object corresponding to the difference between the first driving environment data and the second driving environment data is a moving object (e.g., a car, a bicycle or a pedestrian), and the type of the object does not match the type in the type set, the executing body does not generate the road abnormality information.

In some alternative implementations of this embodiment, step 203 may alternatively be implemented through the following steps not shown in FIG. 2: determining, in response to determining the type of the object matching the at least one type in the preset type set, the difference distance corresponding to the difference; and generating, in response to determining the difference distance being greater than or equal to a preset threshold, the road abnormality information.

In this embodiment, when determining that the type of the obtained object matches the at least one type in the type set, the executing body may further determine the difference distance corresponding to the difference. The difference distance is used to represent a deviation degree of the object. For example, when the object corresponding to the difference is the lane line, the executing body may calculate the distance of the deviation (i.e., the difference distance) of the lane line in the first driving environment data as compared with the lane line in the second driving environment data. When the executing body determines that the difference distance is less than the preset threshold, it is determined that the deviation does not affect the driving of the vehicle. When the executing body determines that the difference distance is greater than or equal to the preset threshold, it is determined that the deviation affects the driving of the vehicle, thus generating the road abnormality information.

Figure 3:
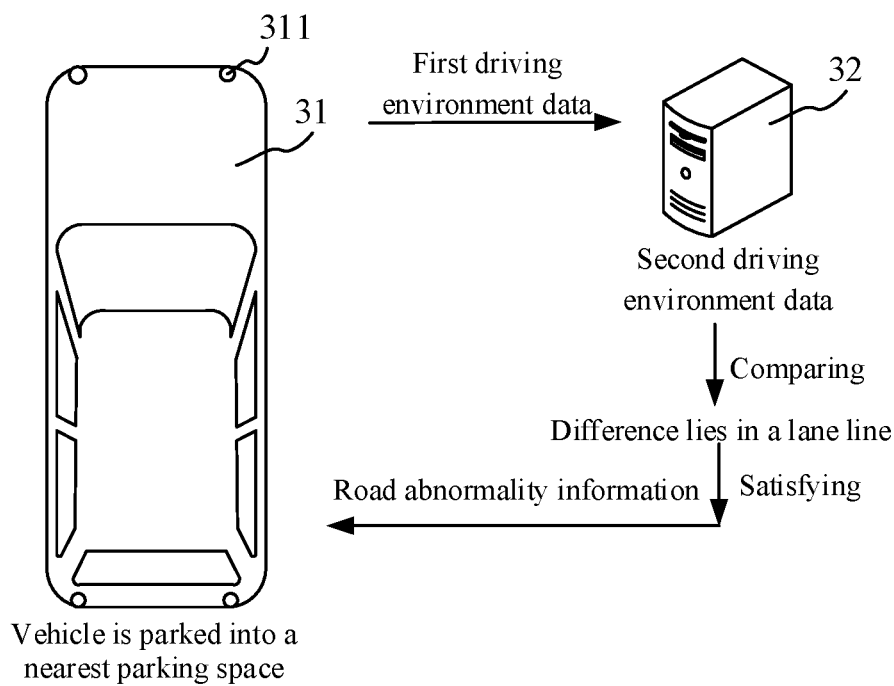
FIG. 3 is a schematic diagram of an application scenario of the method for generating information according to an embodiment of the present disclosure.

Further referring to FIG. 3, FIG. 3 is a schematic diagram of an application scenario of the method for generating information according to this embodiment. In the application scenario of FIG. 3, the autonomous driving vehicle 31 collects the first driving environment data by using the sensor 311 installed on the vehicle during the driving on the road segment XX, and uploads the collected first driving environment data to the service end 32 in real time. The service end 32 compares the first driving environment data with the second driving environment data stored in the database, to determine that the difference therebetween lies in the change of the lane line. The service end 32 determines that the object corresponding to the difference is the lane line and satisfies a preset object type. The service end 32 generates the road abnormality information and sends the road abnormality information to the autonomous driving vehicle 31. After receiving the road abnormality information, the autonomous driving vehicle 31 is parked into a nearest parking space.

The method for generating information provided by some embodiments of the present disclosure may first acquire the first driving environment data of the target road segment. Then, the first driving environment data may be compared with the pre-stored second driving environment data of the target road segment, to determine the difference between the first driving environment data and the second driving environment data. Finally, when it is determined that the difference satisfies the preset condition, the road abnormality information is generated. Therefore, abnormal situations of the target road segment can be found in time, and the road abnormality information can be generated, so that traffic accidents can be reduced.

Figure 4:
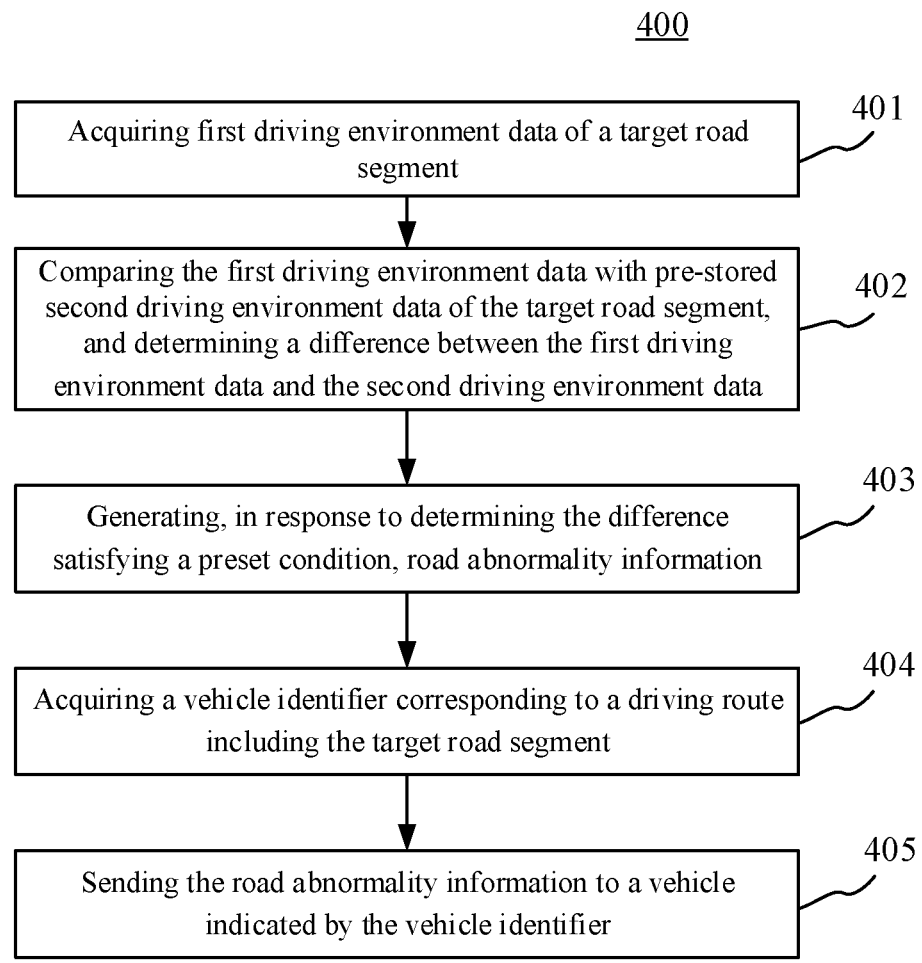
FIG. 4 is a flowchart of the method for generating information according to another embodiment of the present disclosure.

Further referring to FIG. 4, FIG. 4 illustrates a flow 400 of the method for generating information according to another embodiment of the present disclosure. As shown in FIG. 4, in this embodiment, the flow 400 may include the following steps.

Step 401, acquiring first driving environment data of a target road segment.

Step 402, comparing the first driving environment data with pre-stored second driving environment data of the target road segment, and determining a difference between the first driving environment data and the second driving environment data.

Step 403, generating, in response to determining the difference satisfying a preset condition, road abnormality information.

Principles of steps 401-403 are the same as those of steps 201-203, which will not be repeatedly described here.

Step 404, acquiring a vehicle identifier corresponding to a driving route including the target road segment.

In this embodiment, after generating the road abnormality information, the executing body may determine, according to the driving route of a vehicle, the driving route including the target road segment in the above driving route. Then, the vehicle identifier corresponding to the driving route is determined. It may be understood that, for an autonomous driving vehicle, the driving route of the autonomous driving vehicle is preset. The executing body may determine the vehicle identifier of the autonomous driving vehicle when determining that the preset driving route includes the target road segment.

Step 405, sending the road abnormality information to a vehicle indicated by the vehicle identifier.

After determining the vehicle identifier, the executing body may send the road abnormality information to the vehicle indicated by the vehicle identifier. In this way, after receiving the above road abnormality information, the autonomous driving vehicle may change the driving strategy to avoid driving on the target road segment. For example, the autonomous driving vehicle may stop nearby, or the autonomous driving vehicle may select another driving route to drive.

In some alternative implementations of this embodiment, the method may further include the following steps not shown in FIG. 4: updating, in response to determining the difference satisfying the preset condition, the second driving environment data according to the first driving environment data.

In this implementation, after determining that the difference satisfies the preset condition, the executing body may update the second driving environment data according to the first driving environment data. Specifically, the executing body may directly replace the second driving environment data with the first driving environment data. Alternatively, the executing body may replace the driving environment data corresponding to the difference in the second driving environment data with the driving environment data corresponding to the difference satisfying the preset condition in the first driving environment data.

In some alternative implementations of this embodiment, the method may further include the following steps not shown in FIG. 4: generating, in response to a completion of the updating of the second driving environment data, an electronic map according to the updated second driving environment data; and outputting the electronic map.

In this implementation, after the updating of the second driving environment data is completed, the executing body may generate the electronic map according to the updated second driving environment data. Specifically, the executing body may generate the electronic map according to the position of each object (a lane line, a median strip, a building, etc.) in the second driving environment data in relation to the collector of the second driving environment data. The executing body may further output the generated electronic map. Specifically, the executing body may send the generated electronic map to the vehicle indicated by the vehicle identifier in step 404. In this way, the autonomous driving vehicle may drive according to the above electronic map.

According to the method for generating information provided by some embodiments of the present disclosure, the abnormal situation of the target road segment may be found in time, and the relevant vehicle may be notified in time when the road abnormality is found, thereby improving the safety of the relevant vehicle in driving.

Figure 5:
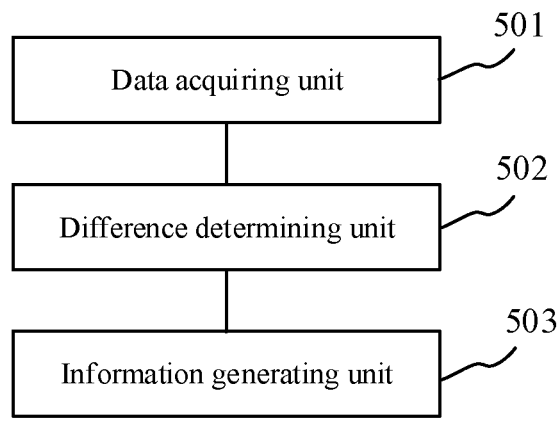
FIG. 5 is a schematic structural diagram of an apparatus for generating information according to an embodiment of the present disclosure.

Further referring to FIG. 5, as an implementation of the method shown in the above drawings, an embodiment of the present disclosure provides an apparatus for generating information. An embodiment of the apparatus may correspond to the embodiment of the method shown in FIG. 2, and the apparatus may be applied in various electronic devices.

As shown in FIG. 5, the apparatus 500 for generating information in this embodiment includes: a data acquiring unit 501, a difference determining unit 502 and an information generating unit 503.

The data acquiring unit 501 is configured to acquire first driving environment data of a target road segment.

The difference determining unit 502 is configured to compare the first driving environment data with pre-stored second driving environment data of the target road segment, and determine a difference between the first driving environment data and the second driving environment data.

The information generating unit 503 is configured to generate, in response to determining the difference satisfying a preset condition, road abnormality information.

In some alternative implementations of this embodiment, the information generating unit 503 may further include a type recognizing module and an information generating module that are not shown in FIG. 5.

The type recognizing module is configured to recognize a type of an object corresponding to the difference.

The information generating module is configured to generate, in response to determining the type of the object matching at least one type in a preset type set, the road abnormality information.

In some alternative implementations of this embodiment, the information generating module may be further configured to: determine, in response to determining the type of the object matching the at least one type in the preset type set, a difference distance corresponding to the difference; and generate, in response to determining the difference distance being greater than or equal to a preset threshold, the road abnormality information.

In some alternative implementations of this embodiment, the difference determining unit 502 may be further configured to: convert, in response to determining the first driving environment data including image data and the second driving environment data including point cloud data or in response to determining the second driving environment data including image data and the first driving environment data including point cloud data, the point cloud data to obtain image data corresponding to the point cloud data; and compare the image data obtained through the conversion with the image data included in the first driving environment data or included in the second driving environment data, to determine a difference between the image data obtained through the conversion and the image data included in the first driving environment data or included in the second driving environment data.

In some alternative implementations of this embodiment, the apparatus 500 may further include an identifier acquiring unit and an information sending unit that are not shown in FIG. 5.

The identifier acquiring unit is configured to acquire a vehicle identifier corresponding to a driving route including the target road segment.

The information sending unit is configured to send the road abnormality information to a vehicle indicated by the vehicle identifier.

In some alternative implementations of this embodiment, the apparatus 500 may further include a data updating unit not shown in FIG. 5. The data updating unit is configured to update, in response to determining the difference satisfying the preset condition, the second driving environment data according to the first driving environment data.

In some alternative implementations of this embodiment, the apparatus 500 may further include a map generating unit and a map outputting unit that are not shown in FIG. 5.

The map generating unit is configured to generate, in response to a completion of the updating of the second driving environment data, an electronic map according to the updated second driving environment data.

The map outputting unit is configured to output the electronic map.

According to the apparatus for generating information provided by some embodiments of the present disclosure, the first driving environment data of the target road segment may first be acquired. Then, the first driving environment data may be compared with the pre-stored second driving environment data of the target road segment, to determine the difference between the first driving environment data and the second driving environment data. Finally, when it is determined that the difference satisfies the preset condition, the road abnormality information is generated. Therefore, an abnormal situation of the target road segment may be found in time, and the road abnormality information may be generated, so that the autonomous driving vehicle can be notified to avoid and reduce traffic accidents.

It should be understood that the units 501-503 described in the apparatus 500 for generating information respectively correspond to the steps in the method described with reference to FIG. 2. Thus, the operations and features described for the method for generating information are also applicable to the apparatus 500 and the units contained therein, which will not be repeatedly described herein.

Figure 6:
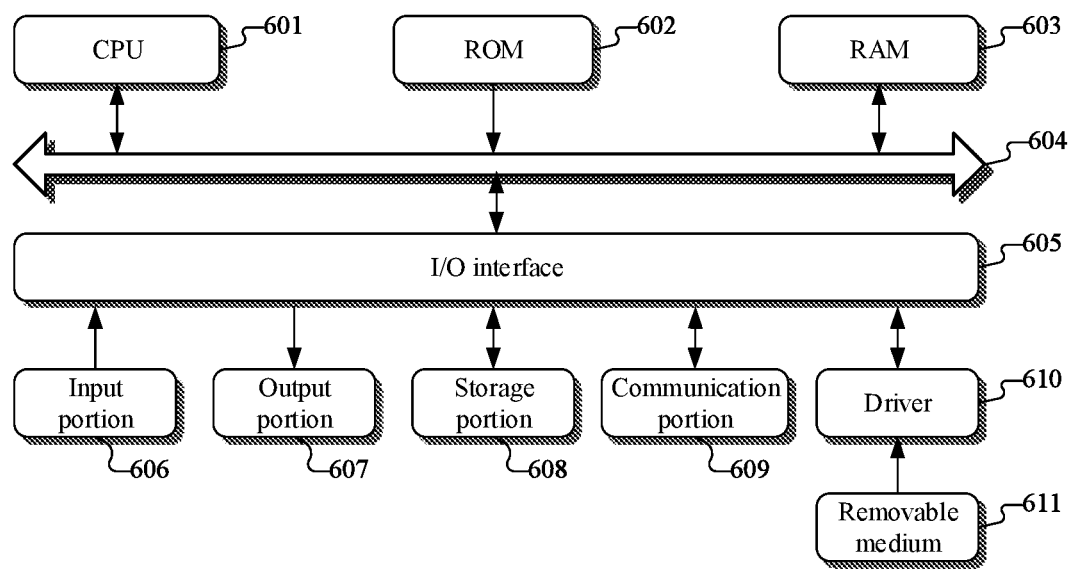
FIG. 6 is a schematic structural diagram of a computer system adapted to implement a server according to embodiments of the present disclosure.

Referring to FIG. 6, FIG. 6 is a schematic structural diagram of a computer system 600 adapted to implement a server of some embodiments of the present disclosure. The server shown in FIG. 6 is merely an example, and should not bring any limitations to the functions and the scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker etc.; a storage portion 608 including a hard disk or the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented as a computer software program.

For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the methods of some embodiments of the present disclosure.

It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. Amore specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In some embodiments of the present disclosure, the computer readable storage medium may be any physical medium containing or storing programs, which may be used by a command execution system, apparatus or element or incorporated thereto. In some embodiments of the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor. For example, the processor may be described as: a processor comprising a data acquiring unit, a difference determining unit and an information generating unit. The names of these units do not in some cases constitute a limitation to such units themselves. For example, the data acquiring unit may alternatively be described as "a unit for acquiring first driving environment data of a target road segment."

In another aspect, some embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire first driving environment data of a target road segment; compare the first driving environment data with pre-stored second driving environment data of the target road segment, and determine a difference between the first driving environment data and the second driving environment data; and generate, in response to determining the difference satisfying a preset condition, road abnormality information.

The above description is only an explanation for embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for generating information, comprising:
acquiring first driving environment data of a target road segment;
comparing the first driving environment data with pre-stored second driving environment data of the target road segment, and determining a difference between the first driving environment data and the second driving environment data; and
generating, in response to determining the difference satisfying a preset condition, road abnormality information,
wherein the determining the difference between the first driving environment data and the second driving environment data includes:
in response to determining that the first driving environment data includes image data and the second driving environment data includes point cloud data, or in response to determining that the second driving environment data includes image data and the first driving environment data includes point cloud data:
converting the point cloud data into image data corresponding to the point cloud data; and
comparing the image data converted from the point cloud data with the image data included in the first or second driving environment data, to determine a difference between the image data converted from the point cloud data and the image data included in the first or second driving environment data, and determining the determined difference as the difference between the first driving environment data and the second driving environment data,
wherein before updating the second driving environment data, the method further comprises:
determining, in driving routes preset for autonomous driving vehicles, a driving route including the target road segment,
acquiring a vehicle identifier corresponding to the driving route including the target road segment; and
sending the road abnormality information to an autonomous driving vehicle indicated by the vehicle identifier, to instruct the autonomous driving vehicle indicated by the vehicle identifier to park into a nearest parking space.

2. The method according to claim 1, wherein the generating, in response to determining the difference satisfying a preset condition, road abnormality information includes:
recognizing a type of an object corresponding to the difference; and
generating, in response to determining the type of the object matching at least one type in a preset type set, the road abnormality information, wherein the preset type set includes at least one of: a lane line type, a traffic sign type, a median strip type, or a building type.

3. The method according to claim 2, wherein the generating, in response to determining the difference satisfying a preset condition, road abnormality information includes:
determining, in response to determining the type of the object matching the at least one type in the preset type set, a difference distance corresponding to the difference; and
generating, in response to determining the difference distance being greater than or equal to a preset threshold, the road abnormality information.

4. The method according to claim 1, wherein the point cloud data is collected by radar detecting apparatus.

5. The method according to claim 1, further comprising:
updating, in response to determining the difference satisfying the preset condition, the second driving environment data according to the first driving environment data.

6. The method according to claim 5, further comprising:
generating, in response to a completion of the updating of the second driving environment data, an electronic map according to the updated second driving environment data; and
outputting the electronic map.

7. The method according to claim 1, wherein the generating, in response to determining the difference satisfying a preset condition, road abnormality information includes:
in response to an object corresponding to the determined difference being of a lane line type, calculating a deviation distance of a lane line in the first driving environment data as compared with a corresponding lane line in the second driving environment data; and
in response to the deviation distance being greater than a preset threshold, generating the road abnormality information.

8. The method according to claim 1, wherein the generating, in response to determining the difference satisfying a preset condition, comprises:
in response to an object corresponding to the determined difference being of a traffic sign type, calculating a deviation distance of a traffic sign in the first driving environment data as compared with a corresponding traffic sign in the second driving environment data; and
in response to the deviation distance being greater than a preset threshold, generating the road abnormality information.

9. The method according to claim 1, wherein the first driving environment data is an image of an environment where a vehicle is located.

10. An apparatus for generating information, comprising:
at least one processor; and
a memory storing instructions, the instructions when executed by the at least one processor, causing the at least one processor to perform operations, the operations comprising:
acquiring first driving environment data of a target road segment;
comparing the first driving environment data with pre-stored second driving environment data of the target road segment, and determining a difference between the first driving environment data and the second driving environment data; and
generating, in response to determining the difference satisfying a preset condition, road abnormality information,
wherein the determining the difference between the first driving environment data and the second driving environment data includes:
in response to determining that the first driving environment data includes image data and the second driving environment data includes point cloud data, or in response to determining that the second driving environment data includes image data and the first driving environment data includes point cloud data:

converting the point cloud data into image data corresponding to the point cloud data; and
comparing the image data converted from the point cloud data with the image data included in the first or second driving environment data, to determine a difference between the image data converted from the point cloud data and the image data included in the first or second driving environment data, and determining the determined difference as the difference between the first driving environment data and the second driving environment data,
wherein before updating the second driving environment data, the operations further comprise:
determining, in driving routes preset for autonomous driving vehicles, a driving route including the target road segment,
acquiring a vehicle identifier corresponding to the driving route including the target road segment; and
sending the road abnormality information to an autonomous driving vehicle indicated by the vehicle identifier, to instruct the autonomous driving vehicle indicated by the vehicle identifier to park into a nearest parking space.

11. The apparatus according to claim 10, wherein the generating, in response to determining the difference satisfying a preset condition, road abnormality information includes:
recognizing a type of an object corresponding to the difference; and
generating, in response to determining the type of the object matching at least one type in a preset type set, the road abnormality information, wherein the preset type set includes at least one of: a lane line type, a traffic sign type, a median strip type, or a building type.

12. The apparatus according to claim 11, wherein the generating, in response to determining the difference satisfying a preset condition, road abnormality information includes:
determining, in response to determining the type of the object matching the at least one type in the preset type set, a difference distance corresponding to the difference; and
generating, in response to determining the difference distance being greater than or equal to a preset threshold, the road abnormality information.

13. The apparatus according to claim 10, wherein the point cloud data is collected by radar detecting apparatus.

14. The apparatus according to claim 10, the operations further comprising:
updating, in response to determining the difference satisfying the preset condition, the second driving environment data according to the first driving environment data.

15. The apparatus according to claim 14, the operations further comprising:
generating, in response to a completion of the updating of the second driving environment data, an electronic map according to the updated second driving environment data; and
outputting the electronic map.

16. A non-transitory computer readable medium, storing a computer program, the computer program, when executed by a processor, causing the processor to perform operations, the operations comprising:
acquiring first driving environment data of a target road segment;
comparing the first driving environment data with pre-stored second driving environment data of the target road segment, and determining a difference between the first driving environment data and the second driving environment data; and
generating, in response to determining the difference satisfying a preset condition, road abnormality information,
wherein the determining the difference between the first driving environment data and the second driving environment data includes:
in response to determining that the first driving environment data includes image data and the second driving environment data includes point cloud data, or in response to determining that the second driving environment data includes image data and the first driving environment data includes point cloud data:
converting the point cloud data into image data corresponding to the point cloud data; and
comparing the image data converted from the point cloud data with the image data included in the first or second driving environment data, to determine a difference between the image data converted from the point cloud data and the image data included in the first or second driving environment data, and determining the determined difference as the difference between the first driving environment data and the second driving environment data,
wherein before updating the second driving environment data, the operations further comprise:
determining, in driving routes preset for autonomous driving vehicles, a driving route including the target road segment,
acquiring a vehicle identifier corresponding to the driving route including the target road segment; and
sending the road abnormality information to an autonomous driving vehicle indicated by the vehicle identifier, to instruct the autonomous driving vehicle indicated by the vehicle identifier to park into a nearest parking space.

* * * * *